United States Patent
Ohta

(10) Patent No.: US 8,958,111 B2
(45) Date of Patent: Feb. 17, 2015

(54) IMAGE PROCESSING SYSTEM AND IMAGE PROCESSING APPARATUS

(71) Applicant: Shingo Ohta, Kanagawa (JP)

(72) Inventor: Shingo Ohta, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/764,195

(22) Filed: Feb. 11, 2013

(65) Prior Publication Data

US 2013/0235428 A1    Sep. 12, 2013

(30) Foreign Application Priority Data

Mar. 7, 2012    (JP) .................. 2012-050637

(51) Int. Cl.
G06K 15/00    (2006.01)
G06F 3/12    (2006.01)
H04N 1/00    (2006.01)
H04N 1/32    (2006.01)

(52) U.S. Cl.
CPC ............ H04N 1/0009 (2013.01); *G06F 3/1231* (2013.01); *G06F 3/1239* (2013.01); *H04N 2201/3223* (2013.01); *G06F 3/1232* (2013.01); *G06F 3/1226* (2013.01); *G06F 3/1273* (2013.01); *G06F 3/1224* (2013.01); *H04N 2201/3276* (2013.01); H04N 1/32122 (2013.01); *H04N 2201/0094* (2013.01); *H04N 2201/3274* (2013.01); *H04N 2201/3202* (2013.01)
USPC ........................ 358/1.16; 358/1.15; 358/1.13

(58) Field of Classification Search
None
See application file for complete search history.

(56) References Cited

U.S. PATENT DOCUMENTS

| | | | |
|---|---|---|---|
| 6,947,182 B1 | 9/2005 | Kumagai | |
| 7,653,839 B2 * | 1/2010 | Takahashi | 714/47.2 |
| 8,786,887 B2 * | 7/2014 | Oku et al. | 358/1.15 |
| 2007/0273921 A1 * | 11/2007 | Yamakawa | 358/1.15 |
| 2007/0294228 A1 * | 12/2007 | Kawana | 707/3 |
| 2008/0074683 A1 * | 3/2008 | Yanamura et al. | 358/1.2 |
| 2008/0162567 A1 * | 7/2008 | Yamauchi et al. | 707/104.1 |
| 2012/0072981 A1 * | 3/2012 | Goto | 726/19 |
| 2012/0188599 A1 * | 7/2012 | Kyono | 358/1.15 |
| 2013/0061036 A1 * | 3/2013 | Oliver | 713/150 |

FOREIGN PATENT DOCUMENTS

| | | |
|---|---|---|
| JP | 2002-283683 | 10/2002 |
| JP | 2004-005233 | 1/2004 |
| JP | 2009-239973 | 10/2009 |
| JP | 2010-140111 | 6/2010 |

* cited by examiner

*Primary Examiner* — Satwant Singh
(74) *Attorney, Agent, or Firm* — Cooper & Dunham LLP

(57) ABSTRACT

An image processing system, having an image processing apparatus, includes a log management section configured to manage logs recording operations executed on the image processing apparatus, condition data to specify a characteristic of an operation needing to be checked, data for generating items to specify items in the logs to be preserved, and a storage device to store the specified items in the logs, wherein the log management section determines whether an executed operation satisfying the characteristic in the condition data has been executed, then upon a positive determination, specifies items corresponding to the executed operation in the logs to be preserved according to the data for generating items.

8 Claims, 11 Drawing Sheets

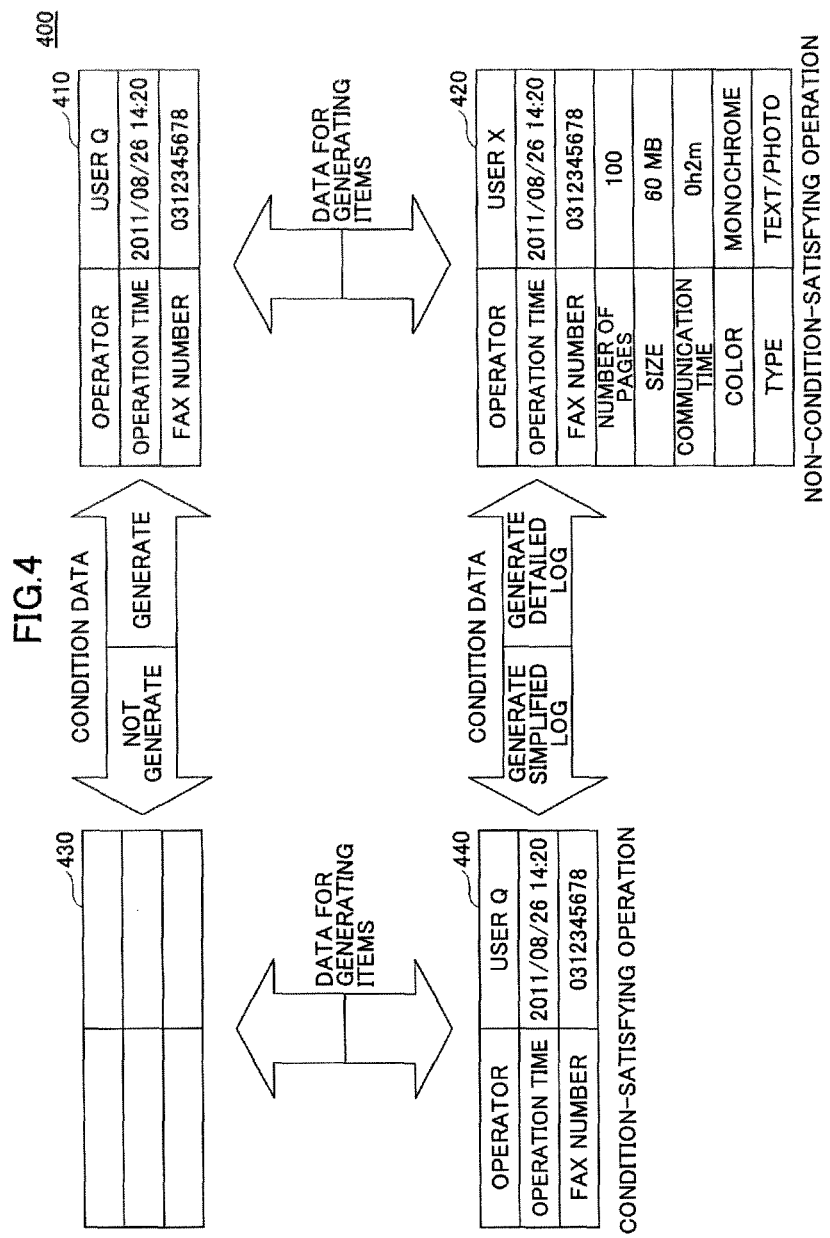

FIG.5

| SPECIFIED OPERATION TO BE LOGGED | SPECIFIED CONTENTS TO BE LOGGED | CONDITION DATA |
|---|---|---|
| COPY (510) | NUMBER OF PAGES | OVER 100 PAGES |
| | COLOR/MONOCHROME | NOT SPECIFIED |
| | SINGLE-SIDED | SPECIFIED |
| | CONTENTS OF ORIGINAL COPY | DIVISION CONFIDENTIAL |
| FAX (520) | NUMBER OF PAGES | OVER 50 PAGES |
| | DESTINATION | SPECIFIED DESTINATION |
| | CONTENTS OF ORIGINAL COPY | COMPANY CONFIDENTIAL |
| PRINTER (530) | NUMBER OF PAGES | 50 PAGES |
| | COLOR/MONOCHROME | NOT SPECIFIED |
| | GATHERING | N/A |
| NETWORK (540) | STORAGE | OVER 10 MB |
| | TRANSFER WITHIN LAN | NOT SPECIFIED |
| | INT ACCESS | SPECIFIED |
| ... | ... | ... |

Table 610:

| ITEM \ OPERATION | FAX JOB | PRINTER JOB |
|---|---|---|
| OPERATION TIME | KEEP | KEEP |
| OPERATION TIME | KEEP | KEEP |
| FAX NUMBER | KEEP | DELETE |
| NUMBER OF PAGES | KEEP | KEEP |
| SIZE | KEEP | DELETE |
| COMMUNICATION TIME | KEEP | KEEP |
| COLOR | KEEP | KEEP |
| TYPE | KEEP | KEEP |
| RESOLUTION | DELETE | KEEP |
| TONNER CONSUMPTION | DELETE | KEEP |

Table 600/620:

| ITEM \ OPERATION/CONDITION | NON-CONDITION-SATISFYING FAX JOB | CONDITION-SATISFYING FAX JOB | NON-CONDITION-SATISFYING PRINTER JOB | CONDITION-SATISFYING PRINTER JOB |
|---|---|---|---|---|
| OPERATION TIME | KEEP | KEEP | KEEP | KEEP |
| OPERATION TIME | DELETE | KEEP | KEEP | KEEP |
| FAX NUMBER | KEEP | KEEP | DELETE | DELETE |
| NUMBER OF PAGES | KEEP | KEEP | KEEP | KEEP |
| SIZE | DELETE | KEEP | DELETE | DELETE |
| COMMUNICATION TIME | KEEP | KEEP | KEEP | KEEP |
| COLOR | KEEP | KEEP | DELETE | KEEP |
| TYPE | DELETE | KEEP | DELETE | KEEP |
| RESOLUTION | DELETE | KEEP | DELETE | KEEP |
| TONNER CONSUMPTION | DELETE | KEEP | DELETE | KEEP |

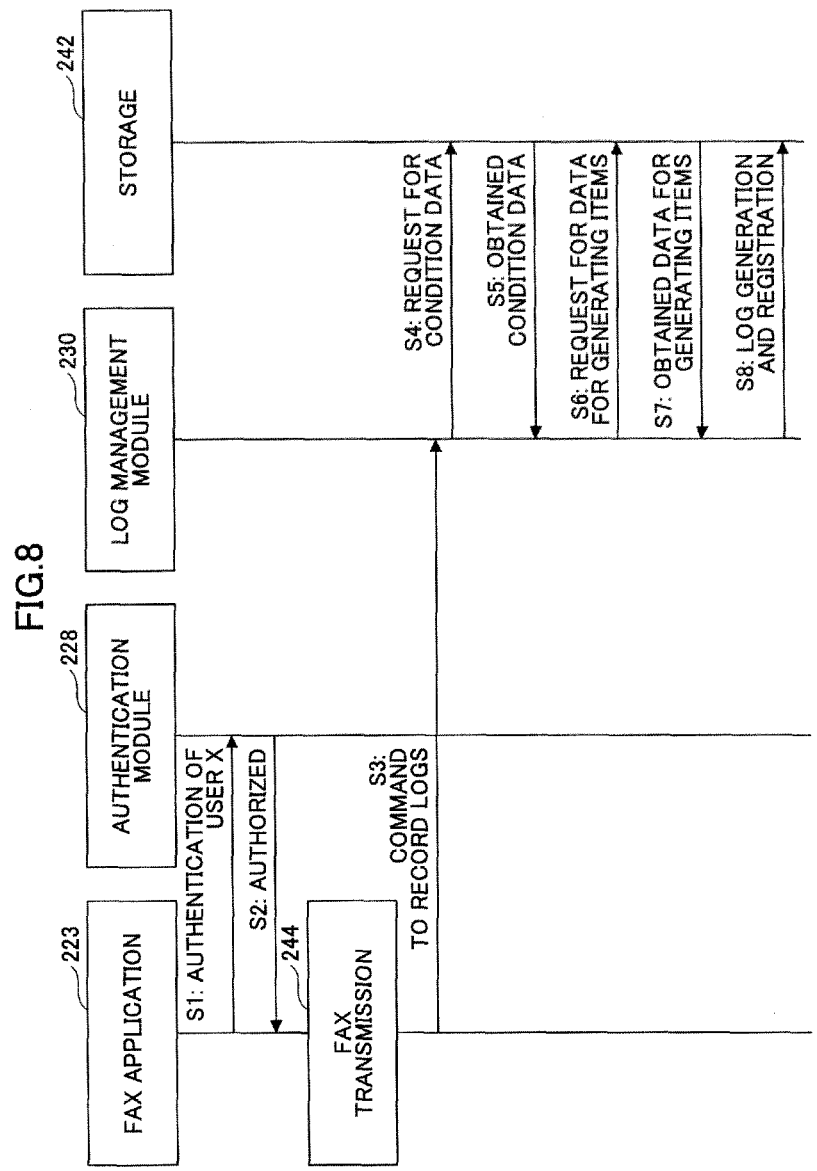

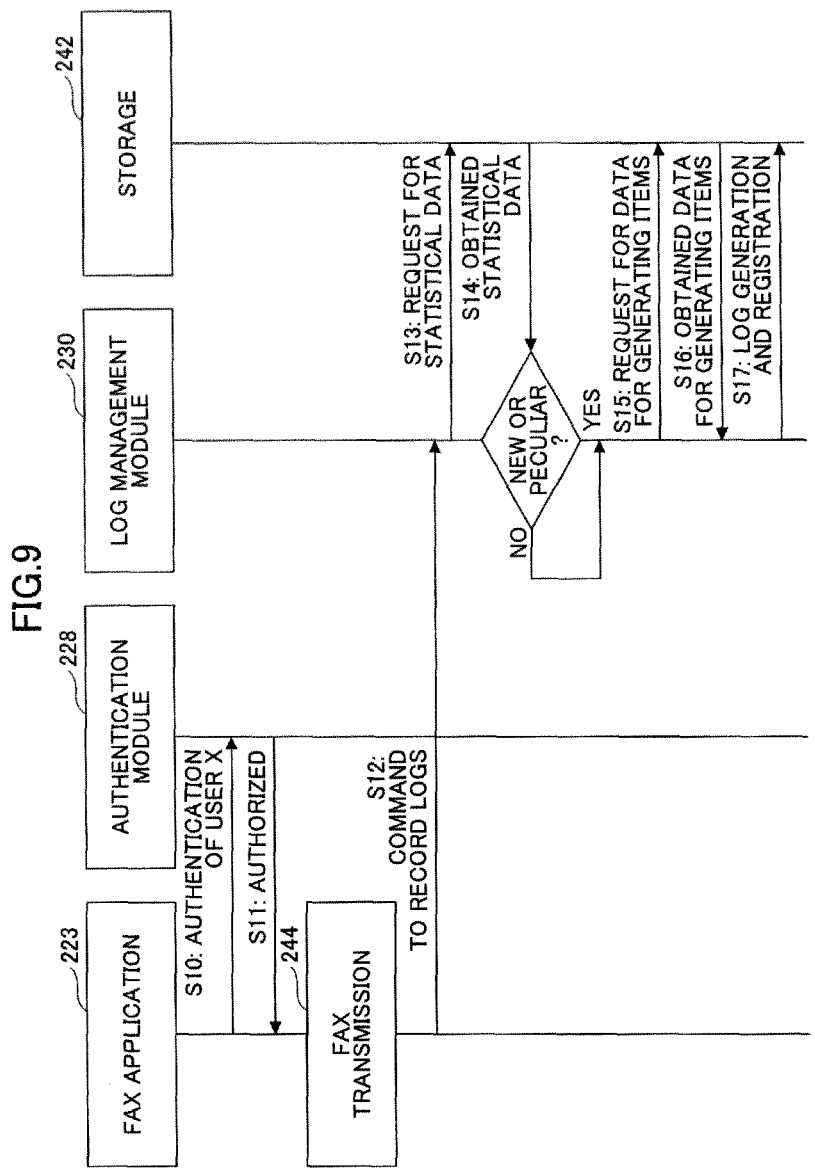

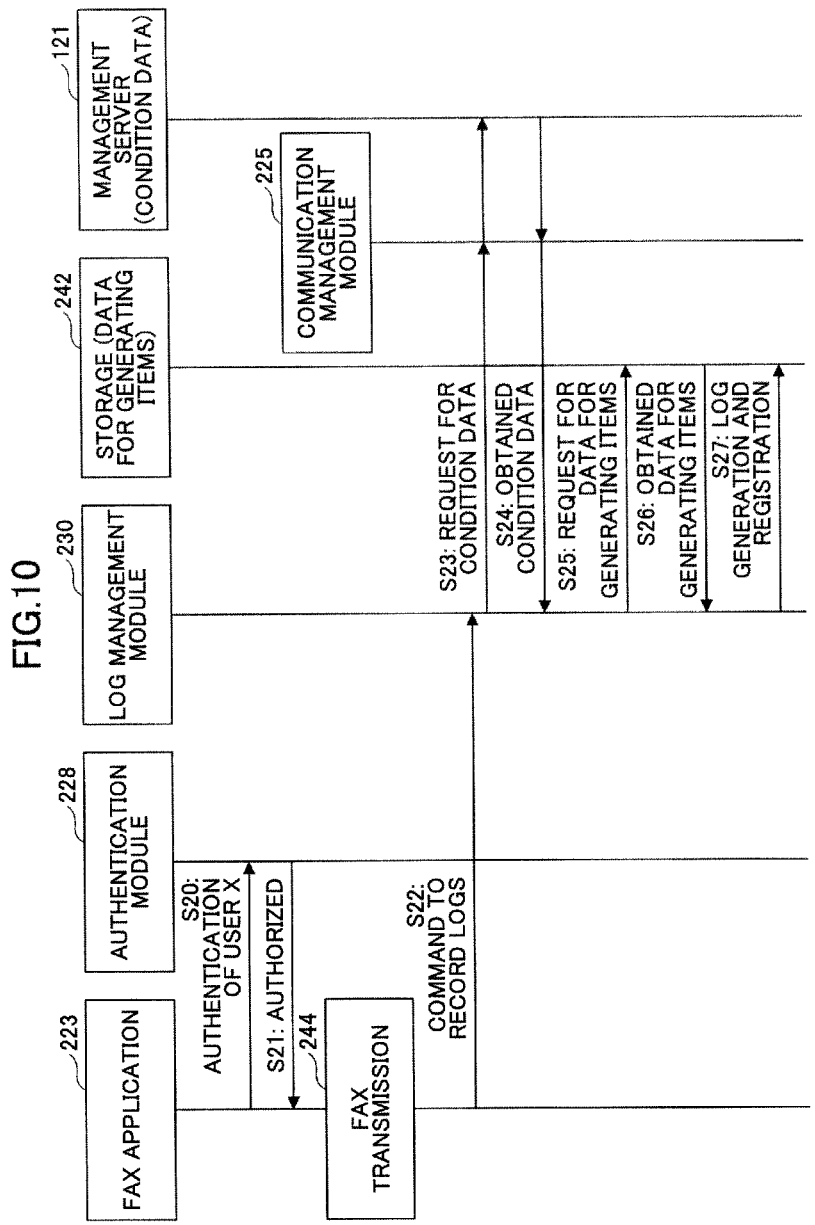

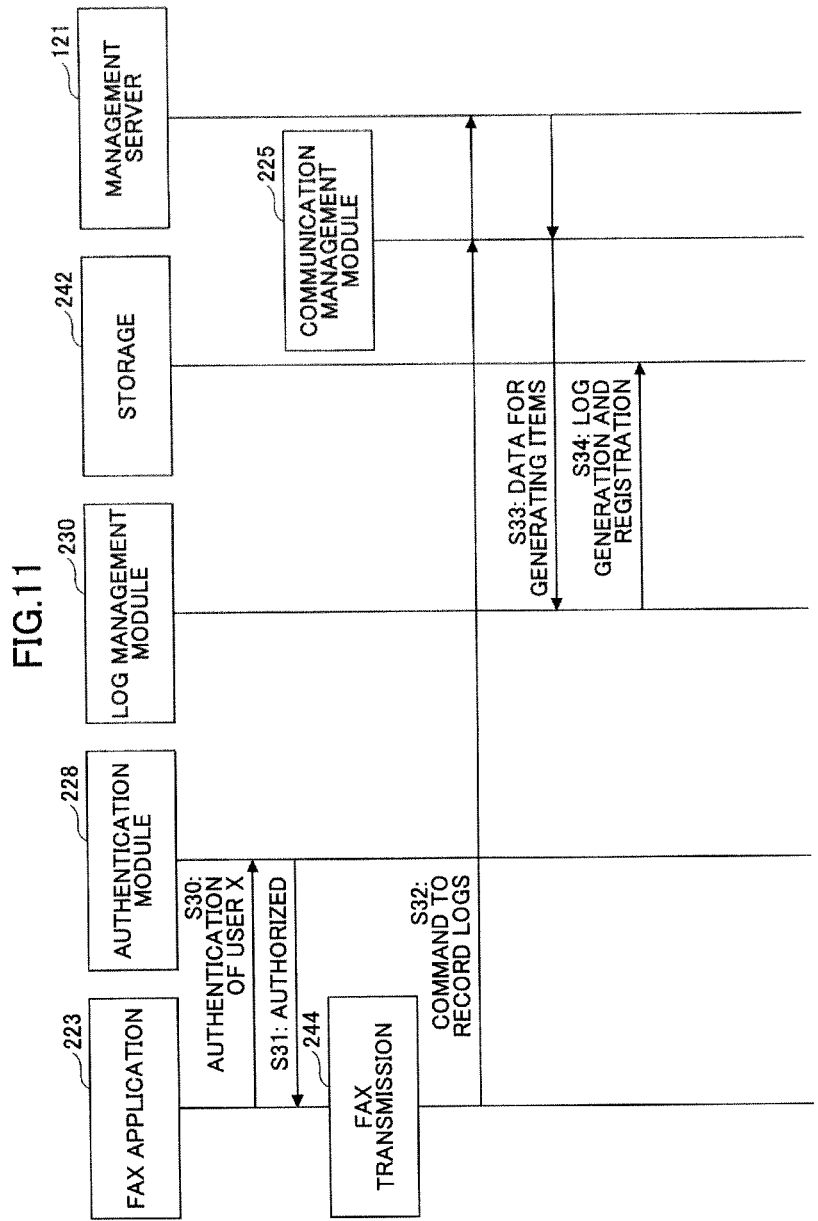

IMAGE PROCESSING SYSTEM AND IMAGE PROCESSING APPARATUS

BACKGROUND OF THE INVENTION

1. Field of the Invention

The disclosures herein generally relate to log management of image processing jobs, specifically, management technology of log generation on image processing apparatuses.

2. Description of the Related Art

In today's office environment, printers, facsimile machines, copy machines, and multifunction peripherals (referred to as MFPs, hereafter) which have multiple image processing functions are installed and shared via networks. As performance of computers or image processing apparatuses increase, image processing and network services executed by printers and MFPs are diversified and amount of processing data tends to increase. Therefore, by recording operations executed by image processing apparatuses in logs, it is possible to analyze executed jobs on the image processing apparatuses and to manage the image processing apparatuses.

A network environment including the above image processing apparatuses may be managed by an information processing apparatus such as a printer server, with which the image processing apparatuses may be also managed. An image processing apparatus may have different inherent functions from those of ordinary information processing apparatuses such as personal computers. Although the image processing apparatus provides similar functions to those of information processing apparatuses, if hardware resources of the image processing apparatus are used without limits for ordinary information processing jobs or storage purposes, it may adversely affect to image processing jobs, in such a way that stable quality of the image processing jobs may not be offered in a long run.

Considering inherent functions of image processing apparatuses, storage resources of the image processing apparatuses should be used for preservation of image data or image processing jobs, rather than log recording. On the other hand, if an image processing apparatus does not leave logs at all, it is inconvenient when functional failures occur or communication management is required. An image processing apparatus may be different from ordinary information processing apparatuses in that an image processing apparatus has highly frequent operations and infrequent operations depending on types of image processing apparatuses. An image processing apparatus may also have highly security-sensitive operations and security-insensitive operations. Therefore, for an image processing apparatus, it is important to save logs for operations which may be peculiar to the image processing apparatus, or may correspond to certain specified conditions, because the logs can be utilized to save resources, for improvement of service quality, for analysis of cause of failures, or for recording a history of illegal accesses.

Taking the above points into account, techniques to accumulate logs on image processing apparatuses have been proposed. For example, Japanese Laid-open Patent Publication No. 2010-140111 (patent document 1) discloses an equipment management system that monitors status of equipment, which provides a log collecting section to collect logs recording various operational histories in the equipment. Also, Japanese Laid-open Patent Publication No. 2002-283683 (patent document 2) discloses an image output device to manage hardware information and control information which includes communication messages between control software modules to indicate internal status changes for efficient analysis of failures or for debugging. Japanese Laid-open Patent Publication No. 2009-239973 (patent document 3) discloses an image processing apparatus which sends a history of copying jobs to a server. Japanese Laid-open Patent Publication No. 2004-5233 (patent document 4) discloses an information management server to manage operational status of clients using the server.

The equipment management system disclosed in the patent document 1 records specified parts of logs according to predetermined methods defined for types of logs collected by the collecting section. But the equipment management system does not generate logs associated with contents of image processing jobs, and does not deal with setting limits to an amount of log data. Also, the patent document 2 describes log generation in terms of unified management of histories of software and hardware operations, but it does not generate logs associated with contents of image processing jobs. Moreover, the patent document 3 and 4 do not deal with controlling log accumulation in the image processing apparatus according to contents of operations.

SUMMARY OF THE INVENTION

It is a general object of at least one embodiment of the present invention to provide an image processing system and an image processing apparatus that substantially obviate one or more problems caused by the limitations and disadvantages of the related art.

Specifically, it is an object of at least one embodiment of the invention to provide an image processing system and an image processing apparatus to make it possible to control log generation by selecting specific logs that record operations executed on the image processing apparatus.

According to at least one embodiment of the present invention, an image processing system, having an image processing apparatus, includes a log management section configured to manage logs recording operations executed on the image processing apparatus, condition data to specify a characteristic of an operation needing to be checked, data for generating items to specify items in the logs to be preserved, and a storage device to store the specified items in the logs, wherein the log management section determines whether an executed operation satisfying the characteristic in the condition data has been executed, then upon positive determination, specifies items corresponding to the executed operation in the logs to be preserved according to the data for generating items.

The log management section may also include a condition controlling section and a log recording section. The condition controlling section extracts parts of the logs including the items specified according to the data for generating items, from the logs managed by the log management section in order to generate extracted logs. The extracted logs are called on-demand logs. The log recording section preserves the extracted logs generated by the condition controlling section into the storage device.

Moreover, the log management section may send the logs managed by the log management section to a server connected via a network, then, delete the logs in the image processing apparatus. The server may be a printer server or a management server configured to manage either one of the condition data or the data for generating items, or both the condition data and the data for generating items.

The image processing apparatus may preserve only extracted logs that satisfy the conditions, or the on-demand logs, into a storage device.

BRIEF DESCRIPTION OF THE DRAWINGS

Other objects and further features of embodiments will be apparent from the following detailed description when read in conjunction with the accompanying drawings, in which:

FIG. 4 is a schematic view illustrating generation of on-demand logs 400 according to an embodiment of the present invention;

FIG. 5 is a schematic view illustrating condition data 500 according to an embodiment of the present invention;

FIG. 6 is a schematic view illustrating data for generating items 600 according to an embodiment of the present invention;

FIG. 8 is a sequence chart illustrating that an image processing apparatus generates on-demand logs locally, according to an embodiment of the present invention;

FIG. 9 is a sequence chart illustrating a case where statistical data is used as condition data, taking a FAX operation as an example, as shown in FIG. 8, according to an embodiment of the present invention;

FIG. 10 is a sequence chart illustrating a case where data for generating items is managed in a local storage device such as an HDD 242, and a management server 121 manages condition data, according to an embodiment of the present invention; and FIG. 11 is a sequence chart illustrating a case where a management server 121 manages condition data and data for generating items, according to an embodiment of the present invention.

DESCRIPTION OF THE PREFERRED EMBODIMENTS

Figure 1:
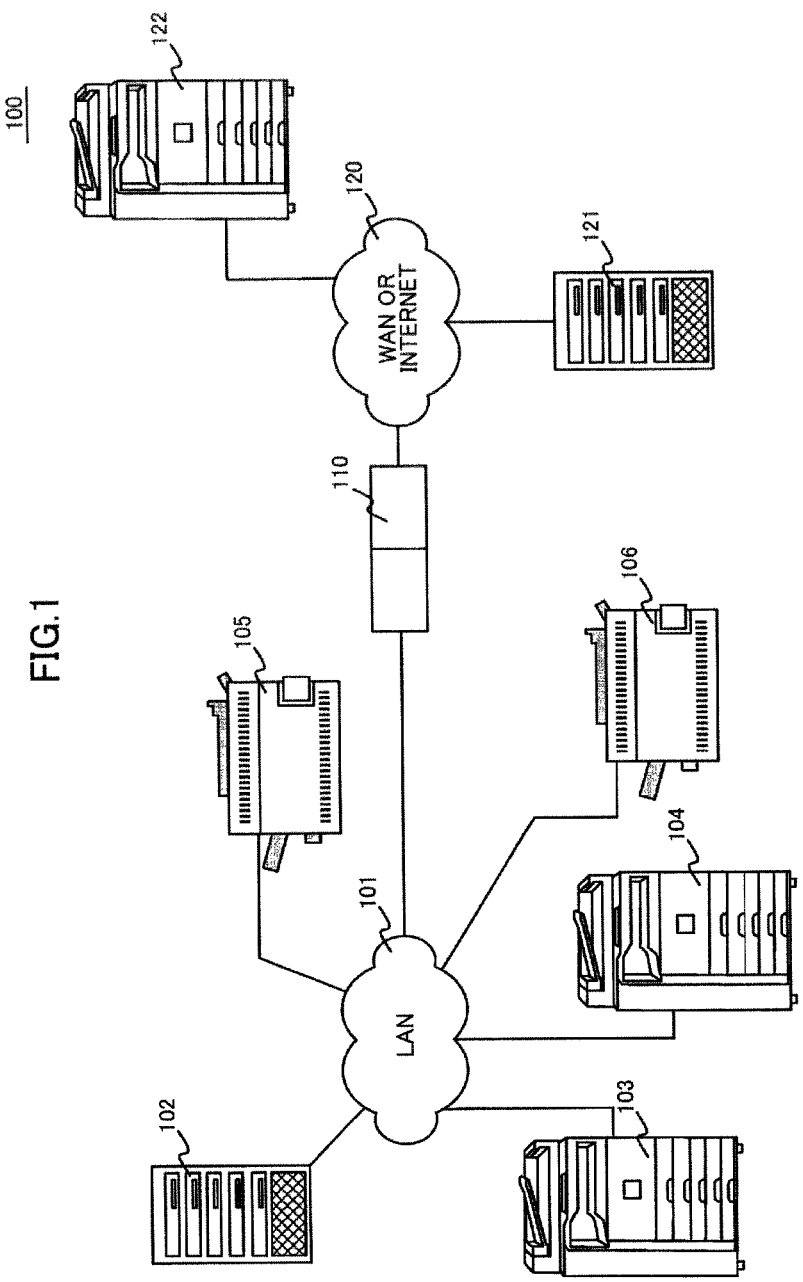
FIG. 1 is a schematic view of an image processing system 100 according to an embodiment of the present invention.

In the following, embodiments of the present invention will be described with reference to the accompanying drawings. It is noted that he present invention is not limited to these embodiments. FIG. 1 is a schematic view of an image processing system 100 according to an embodiment of the present invention. The image processing system 100 is simply referred to as the system 100, hereafter. Although the system 100, in the present embodiment illustrated with FIG. 1, is a printer network, it can be seen broadly as a network system executing FAX operations, image transfer, HTTP transactions, FTP transactions, data accessing and the like.

The system 100 shown in FIG. 1 is configured with a local area network (LAN) 101, to which a server 102, MFPs 103, 104, printers 105, 106 and the like are connected. The system 100 makes it possible to execute data transfer, document printing, FAX sending, data accessing, and the like in the LAN 101. The server 102 may be implemented as a printer server, or a printer server with functions of an HTTP server, or an FTP server. The LAN 101 is connected to a router 110 via an appropriate HUB (not shown here).

The router 110 connects MFPs or personal computers (not shown here) connected to the LAN 101 to a wide area network (WAN) 120 or the Internet using techniques such as network address transformation (NAT), IP masquerade or the like. To the WAN 120, a management server 121 provided by an appropriate internet service provider (ISP) or an MFP 122 installed at other remote site is connected, which enables data transactions between the LAN 101 and the WAN 120.

Figure 2:
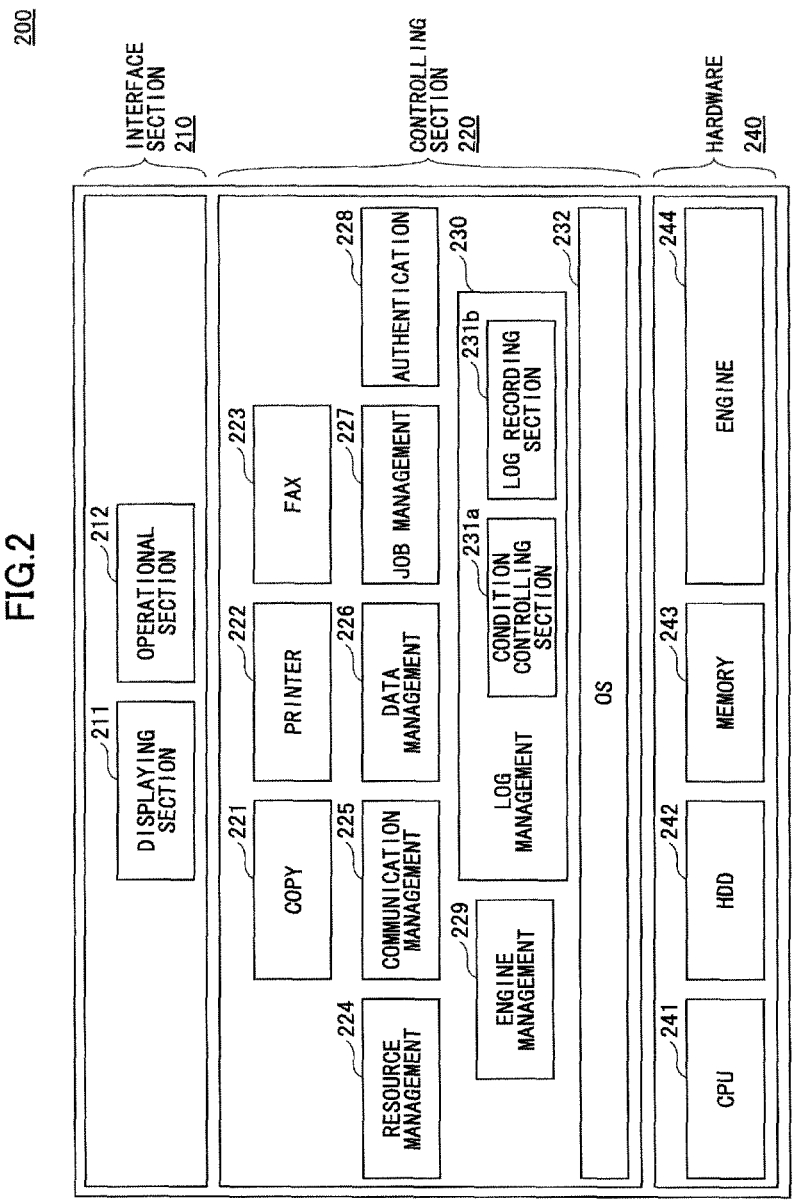
FIG. 2 is a functional block diagram of apparatuses MFP 103, 104, 122 or the like, according to an embodiment of the present invention.

FIG. 2 is a functional block diagram 200 of image processing apparatuses MFP 103, 104, 122 or the like. The functional block diagram 200 of the image processing apparatus shows a three-layer structure of the image processing apparatus including a interface section 210, a controlling section 220, and a hardware section 240. The interface section 210 at the highest layer includes a displaying section 211 for user operations and a operational section 212 to receive operations from users, which provide user interface functions at the very close end to users.

Also, a controlling section 220 is configured with a copying application 221, a printer application 222, a FAX application 223, a scanner application, and the like, which are typical applications to be offered by an MFP. In addition, the controlling section 220 also includes various middleware to offer application program interfaces (APIs) to manage various data in an MFP and to interface with an operating system (OS) 232. The OS 232 is not restricted to specific OSes. UNIX (registered trademark) or Linux (registered trademark) may be used.

The controlling section 220 provides a log management module 230. The log management module 230 is configured with a condition controlling section 231a and a log recording section 231b. The condition controlling section 231a obtains condition data used for generating logs on-demand and data for generating items in which contents to be generated in logs are specified, via a condition controlling section 231a. Moreover, the condition controlling section 231a extracts items satisfying conditions in the data for generating items, from original logs managed temporarily by the log management module 230, and generates on-demand logs 310 according to specifications on contents to be generated with the MFP. After that, the generated on-demand logs 310 are stored in an appropriate non-volatile storing section such as an HDD, an NVRAM, a flash memory or the like, by the log recording section 231b.

It is noted that, in the present embodiment, an "original log" means a history of all default records of operations on an image processing apparatus, generated by the image processing apparatus. An "on-demand log" means a history generated with extracting information about specific items from an original log, by referring to the condition data and/or the data for generating items. In the present embodiment, the condition controlling section 231a simply deletes an original log when specified conditions do not correspond to any items in the log, after generating a simplified log or detailed log.

The MFP includes, moreover, a CPU 241, a storage device such as an HDD 242, various memory devices such as a RAM, a ROM, SD cards or the like, and an engine 244 to form images, to send FAXes, to execute scanning, to access networks via a NIC, and the like. The image processing apparatus provides its functions by having the CPU 241 read various applications into a memory area such as the RAM to apply operations of the applications to data, then, having the engine 244 output the data outside after executing the operations.

Figure 3:
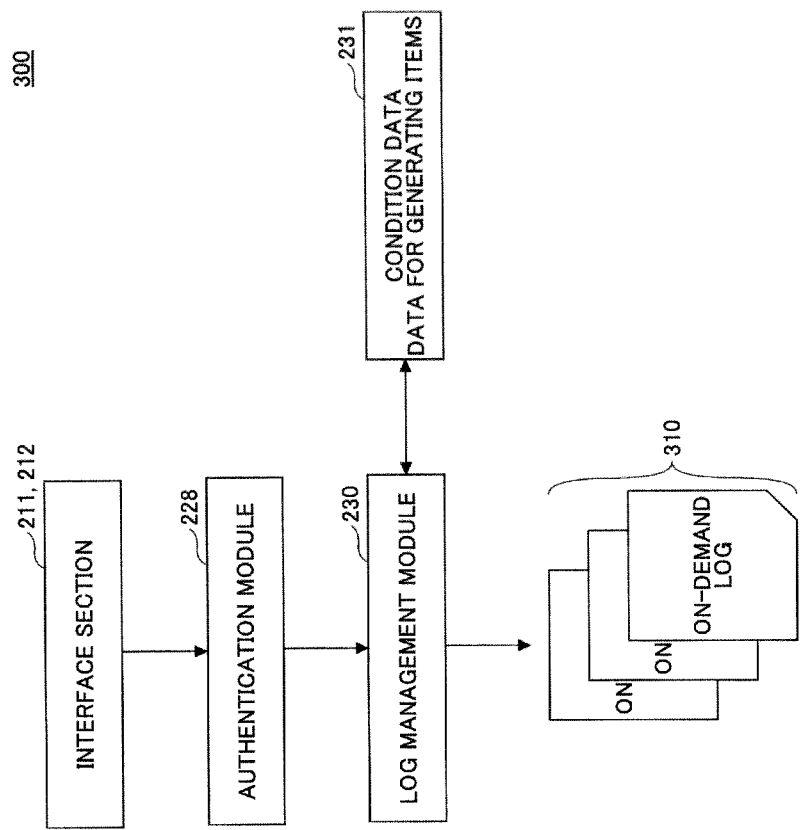
FIG. 3 is a data flow diagram illustrating data flow between modules in the functional block diagram shown in FIG. 2 when the image processing system 100 generates on-demand logs according to an embodiment of the present invention.

FIG. 3 is a data flow diagram illustrating data flow between modules in the functional block diagram shown in FIG. 2 when the system 100 generates on-demand logs according to the present embodiment. A user issues a command to execute his/her intended operations to the image processing apparatus. When issuing the command, the user may also input data through the displaying section 211 or the operational section 212 of the interface section 210, or may have a scanner capture an original copy image. An authentication module 228 of the image processing apparatus is called first in response to receiving the user operations, to determine access permission of the user with identification and a password of the user. If the access permission is confirmed, the authentication module 228 activates the engine 244 to execute the operations requested by the user. After completing the operations, a log management module 230 is called to generate logs on the executed operations according to the present embodiment.

When generating the logs, the log management module 230 refers to the condition data or the data for generating items which lists items to be generated into logs. The data may be held by the image processing apparatus locally, or managed by a server connected via a network. Referring to the data, the log management module 230 determines peculiarity or newness of operations to be recorded at the moment. According to the above determination, the log management module 230 extracts items to be generated into an on-demand log from the original logs which record all operations executed on the image processing apparatus. The log management module 230, then, makes a file containing the extracted items, and stores the file as the on-demand log 310 into an appropriate storage device.

FIG. 4 is a schematic view illustrating generation of on-demand logs 400 according to the present embodiment. On-demand logs 410-440 shown in FIG. 4 are determined to be generated or not, based on contents of the condition data which can be set for each type of operations executed by the MFPs. More specifically, when the image processing apparatus generates logs for a certain type of operations, the log management module 230 refers to the condition data which may be specified by an administrator, and determines whether items that correspond to conditions in the condition data are included in the original logs.

When the log management module 230 determines that the specified operations have been executed, the log management module 230 refers to the data for generating items, extracts items corresponding to the specified operations from the original log, then, generates an on-demand log 410 or an on-demand log 420. The on-demand log 410 and the on-demand log 420 are different in terms of items to be generated in the log. For example, the on-demand log 410 can be referred to as a simplified log, whereas the on-demand log 420 can be referred to as a detailed log of contents of operations. Contents generated in a simplified log or in a detailed log can be set appropriately in the data for generating items.

On the other hand, in case of no corresponding operations, when generating a simplified log, it is possible to generate nothing as an on-demand log 430. When generating a detailed log, it can be specified in the data for generating items to generate a simplified on-demand log 440 instead of an on-demand log 420.

It is noted that, in the present embodiment, the log management module 230 records logs of all executed operations in the original logs, then generates on-demand logs. After that, the original log is deleted to save storing resources or to eliminate duplicated copies. Other embodiments are possible where the original logs are sent before being discarded, for example, to a server connected via the LAN 101 or the wide network 120, where the logs are recorded as histories of operations.

FIG. 5 is a schematic view illustrating condition data 500 used in the present embodiment. In the condition data 500, conditions are specified for various operations of an MFP including, for example, copy 510, facsimile 520, print 530, network 540. For copy 510, for example, conditions are specified for cases such as copying of more than 100 pages, execution of single-sided copy, and copying of an original copy with a division confidential mark on the original copy. The log management module 230 generates an on-demand log based on logical OR of the conditions, i.e., even if just one of the conditions in the condition data is met, the on-demand log is generated.

Also, conditions are set for various operations including facsimile job conditions 520, printer job conditions 530, and network access conditions 540, in terms of the number of sheets, address, storage capacity, etc., which specify characteristics of the operations. The condition data shown in FIG. 5 can be stored in a storage device such as the HDD 242 as data for the log management module 230, with any format such as a table, text, a CSV format, comma-separated data, a spread sheet, or any other appropriate format to store data.

The data may be created with a format used for widely available spread sheet software for the sake of convenience of an administrator of MFPs and the like. Also, in embodiments in which MFPs are provided with functions of a Web server or an FTP server, a configuration may be taken with which an administrator may specify network settings.

FIG. 6 is a schematic view illustrating the data for generating items 600 according to the present embodiment. Data for generating items 610 is used for generating a simplified log. It specifies items to be left for FAX jobs and printer jobs when some of the conditions in the condition data are met. When none of the conditions is met, the simplified log includes a fixed set of items, for example, a time stamp and a type of operation. Items to be left can be specified otherwise depending on an operation environment.

On the other hand, data for generating items 620 has a format in which items are specified not only when some of the conditions are met, for each of the operations, which are FAX jobs and printer jobs in this particular example. When using the data for generating items 620, regardless of meeting the conditions or not, an administrator can modify generating items if necessary, which may be convenient, for example, when generating the on-demand logs 420, 440 in FIG. 4, or when used to manage multiple MFPs.

Figure 7:
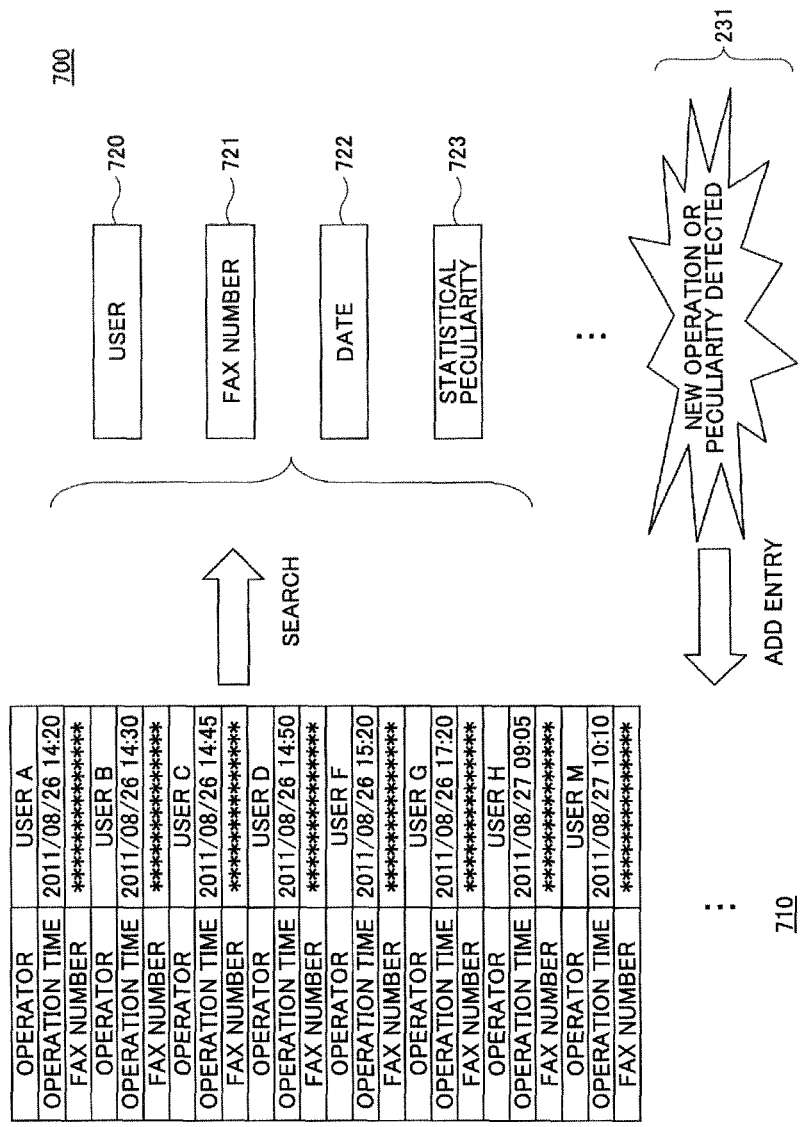
FIG. 7 is a schematic view illustrating generation of an on-demand log according to an embodiment of the present invention.

FIG. 7 is a schematic view illustrating generation of an on-demand log according to another embodiment of the invention. The on-demand log 710 shown in FIG. 7 includes user names, operation time stamps, and FAX numbers according to data for generating items. When a new operation is executed, the log management module 230 searches for items in the on-demand log 710 with respect to items included in the original log.

Items to be searched for can be specified in the condition data, which includes fixed type of items, for example, a user name 720, a FAX number 721, or a date 722. Other than these, original logs saved in a server in advance are processed statistically to analyze frequency of specific operations to determine setting of peculiar operations 723. In the present embodiment, when a specific item or a set of specific items are new, or when there are statistical peculiarities, items may be registered additionally to the on-demand log 710 within an area of the system specified in the data for generating item with respect to the on-demand log 710.

Generation of the on-demand log explained with FIG. 4 or FIG. 7 leaves contents of specified operations or peculiar operations, deletes items whose logs are not needed in the local site such as an MFP to use storing resources of the MFP efficiently. When the original log is uploaded to, for example, a printer server or a management server via a network, instead of a mirroring upload, the original log can be deleted on the MFP to use the storing resources of the MFP efficiently to leave only the on-demand log on the MFP which is easier to analyze.

In the following, a process of generating an on-demand log for a FAX operation will be explained with reference to FIG. 8 to FIG. 11. Although a FAX operation is taken as an example, other operations may be executed in a similar way. FIG. 8 shows a sequence chart illustrating the image processing apparatus that generates on-demand logs locally.

As shown in FIG. 8, when the user issues a command for a FAX operation, the displaying section 211 displays a screen for user authentication. The user inputs user authentication information, which is sent to the authentication module 228 to enable the image processing apparatus to execute a process of authentication of the user, called X, at Step S1. The authentication module 228 has a database function to make a query to the database with the received authentication data. If the authentication data is authorized, it returns a successful result of authentication back to a FAX application 223, at Step S2.

The FAX application 223 executes FAX transmission by activating a hardware module in the engine 244 for FAX transmission. After completing the execution, the FAX application 223 stores an original log at Step S3, then, sends the original log with a command to store the log to the log management module 230. The log management module 230 makes a request for condition data to a storage device such as the HDD 242 at Step S4, then, obtains the condition data to determine checking conditions at Step S5. At Step S6, the log management module 230 makes a request for data for generating items corresponding to the determined conditions, and obtains the data for generating items at Step S7.

After that, at Step SB, the log management module 230 extracts items registered in the data to generate an on-demand log, and stores the log in the storage device such as the HDD 242. It is noted that it is preferable that the log management module 230, before deleting the original log, upload the original log to a printer server or an equipment management server with an identification of the image processing apparatus to make it possible to manage the original log.

Also, the log management module 230, while it is activated, may access the storage device such as the HDD 242 just once soon after reset to save necessary data into the RAM. In this case, Steps S4, S5, and S7 need to be executed just once, which make it more efficient.

FIG. 9 is a sequence chart illustrating a case where statistical data is used as condition data, taking FAX operations as an example, as done with FIG. 8. When the user issues a command for a FAX operation, the displaying section 211 displays a screen for user authentication, the user inputs user authentication information, which is sent to the authentication module 228 to enable the image processing apparatus executes a process of authentication of the user, called X, at Step S10. The authentication module 228 queries to the database with the received authentication data. If the authentication data is authorized, it returns a successful result of authentication back to the FAX application 223, at Step S11.

The FAX application 223 executes FAX transmission by activating the hardware module in the engine 244 for FAX transmission. After completing the execution, the FAX application 223 stores an original log at Step S12, then, sends the original log with a command to store the log to the log management module 230. In response to receiving the command, the log management module 230 makes a request for statistics data to the storage device at Step S13.

When determining whether the operation is new, contents of specified items are searched for in the original log, at Step S13. After that, at Step S14, it is determined whether there are statistical characteristics or any new items, by obtaining statistics data, or by receiving search results. At Step S15, data for generating items corresponding to the determination result is requested.

The log management module 230, at Step S16, obtains the data for generating items, extracts items registered in the data for generating items, generates an on-demand log at Step S17, and stores the log in the storage device such as the HDD 242. It is noted that it is preferable that the log management module 230, before deleting the original log, upload the original log to a printer server or an equipment management server with an identification of the image processing apparatus to make it possible to manage the original log, as explained with FIG. 8.

When the original log is not peculiar, or does not include any new items, Step S15 or S17 is executed next with operations for cases which are not peculiar, nor new.

FIG. 10 is a sequence chart illustrating a case where data for generating items is managed in a local storage such as HDD 242, and, a management server 121 manages condition data. For the same operations as in the cases illustrated with FIG. 8 and FIG. 9, detailed explanation will be skipped. The same operations are the user's command for a FAX operation, Step S20 for user X's authentication, and Step S22 where a command for recording log is sent to the log management module 230.

In response to receiving the command, the log management module 230 makes a request for condition data to the management server via the communication management module 225 at Step S23, to obtain the condition data at Step S24. Using the obtained condition data, the log management module 230 determines a policy to generate an on-demand log from the present log, then makes a request for data for generating items corresponding to the policy to the storage device such as the HDD 242 at Step S25. At Step S26, the log management module 230 obtains the data for generating items, and at Step S27, generates an on-demand log according to the obtained data for generating items to store into the HDD 242.

It is preferable that the log management module 230 in FIG. 10, before deleting the original log, upload the original log to a printer server or an equipment management server with an identification of the image processing apparatus to make it possible to manage the original log, as explained with FIG. 8. An alternative configuration may be adopted in which Step 023 to S26 may be executed just once after reset operations of the log management module 230. After that, peculiarity or newness of image processing operations may be determined in the image processing apparatus to generate the on-demand log locally.

FIG. 11 is a sequence chart illustrating a case where a management server 121 manages condition data and data for generating items. In FIG. 11, Steps S30 to S32 are the same as those of FIG. 8 to FIG. 10. Therefore, detailed explanation will be skipped. After sending a FAX, the FAX application 223 sends the original log to the management server 121 via the communication management module 225 using an appropriate protocol such as HTTP protocol at Step S32. The management server 121 adds the received original log to existing logs to make it possible to manage the original log of the image processing apparatus.

Also, the management server 121 does not send the condition data to the log management module 230. The management server 121, which is remote from the image processing apparatus, directly determines peculiarity in the original log which is being processed using the condition data. The management server 121 uses the condition data to analyze the original log to determine peculiarity and/or newness, and sends the data for generating items to the log management module 230 at Step S33. At Step S34, the log management module 230 extracts items from the original log according to the received data for generating items, and generates an on-demand log to store in a local storage device such as the HDD 242. Having sent the original log to the remote server, or the management server 121, the log management module 230 deletes the original log to conclude the series of operations.

Moreover, other embodiments may be possible in which when the log management module 230 or the management server 121 detects a specified operation, an electronic mail is sent to an administrator to indicate the detection in real time. With these embodiments, the administrator can efficiently detect specified operations to manage image processing jobs efficiently.

Using the embodiments explained above, it is possible to prevent a local device such as an image processing apparatus from consuming its storing resources with logs, which in turn makes it possible to use the storing resources of the image processing apparatus for its inherent purposes of image processing. Also, it becomes easier to manage frequency of specific operations on a specific image processing apparatus, which makes management of image processing jobs more efficient in terms of resource usage and improvement of security.

As explained above, according to the embodiments of the invention, an image processing system and an image processing apparatus can provide functions to select logs for specific operations executed on the image processing apparatus to generate logs, which makes it possible to manage the storing resources of the image processing apparatus efficiently and to manage operations on the image processing apparatus efficiently.

Further, the present invention is not limited to these embodiments, but various variations and modifications may be made without departing from the scope of the present invention.

The present application is based on Japanese Priority Application No. 2012-050637, filed on Mar. 7, 2012, with the Japanese Patent Office, the entire contents of which are hereby incorporated by reference.

What is claimed is:

1. An image processing system, including an image processing apparatus, comprising:
a log management section configured to manage logs recording operations executed on the image processing apparatus;
a user interface to allow a user to specify one or more items to be preserved in the logs; and
at least one storage device to store
condition data to specify a characteristic of an operation needing to be checked;
data for generating the user-specified items, to specify items in the logs to be preserved; and
the user-specified items to be included in the logs;
wherein the log management section determines whether an executed operation satisfying the characteristic in the condition data has been executed, then upon a positive determination, specifies items corresponding to the executed operation in the logs to be preserved according to the data for generating the user-specified items, and
wherein the items to be included in the logs are determined based on the data for generating the user-specified items which are specified via the user interface by the user.

2. The image processing system as claimed in claim 1, wherein the log management section further comprises a condition controlling section configured to extract parts of the logs including the items specified according to the data for generating the user-specified items, from the logs managed by the log management section in order to generate extracted logs.

3. The image processing system as claimed in claim 2, wherein the log management section further comprises a log recording section to preserve the extracted logs generated by the condition controlling section into the storage device.

4. The image processing system as claimed in claim 1, wherein the log management section sends the logs managed by the log management section to a server connected via a network, then, deletes the logs in the image processing apparatus.

5. The image processing system as claimed in claim 4, wherein the server is a printer server or a management server configured to manage either one of the condition data or the data for generating the user-specified items, or both the condition data and the data for generating the user-specified items.

6. An image processing apparatus providing multiple functions, comprising:
a log management section configured to manage logs recording operations executed on the image processing apparatus;
a user interface to allow a user to specify one or more items to be preserved in the logs; and
at least one storage device to store
condition data to specify a characteristic of an operation needing to be checked,
data for generating the user-specified items, to specify items in the logs to be preserved, and
the user-specified items to be included in the logs;
wherein the log management section determines whether an executed operation satisfying the characteristic in the condition data has been executed, then upon a positive determination, specifies items corresponding to the executed operation in the logs to be preserved according to the data for generating the user-specified items, and
wherein the items to be included in the logs are determined based on the data for generating the user-specified items which are specified via the user interface by the user.

7. The image processing apparatus as claimed in claim 6, wherein the log management section further comprises:
a condition controlling section configured to extract parts of the logs including the items specified according to the data for generating the user-specified items, from the logs managed by the log management section in order to generate extracted logs; and
a log recording section to preserve the extracted logs generated by the condition controlling section into the storage device.

8. A non-transitory computer-readable recording medium having a program stored therein for causing a computer to execute a method of controlling logs generated on an image processing apparatus, the logs being stored in a storage device, the method comprising:
providing a log management section by the image processing apparatus to manage logs recording operations executed on the image processing apparatus;
providing a user interface to allow a user to specify one or more items to be preserved in the logs;
storing in at least one storage device
condition data to specify a characteristic of an operation needing to be checked,
data for generating the user-specified items, to specify items in the logs recorded with execution of the operation and needing to be preserved, and the user-specified items to be included in the logs;

determining by the log management section whether an operation satisfying the characteristic specified in the condition data has been executed, and then upon a positive determination, specifying items corresponding to the executed operation in the logs to be preserved according to the data for generating user-specified items, and wherein the items to be included in the logs are determined based on the data for generating the user-specified items which are specified via the user interface by the user.

* * * * *